US012134749B2

(12) United States Patent
Arlabosse et al.

(10) Patent No.: US 12,134,749 B2
(45) **Date of Patent: *Nov. 5, 2024**

(54) SHAPED DETERGENT PRODUCT COMPOSITION COMPRISING AMINOPOLYCARBOXYLATE

(71) Applicant: Conopco Inc., Englewood Cliffs, NJ (US)

(72) Inventors: Hélène Julie Marie Arlabosse, Dordrecht (NL); Robert Jan Moll, Dordrecht (NL)

(73) Assignee: Conopco Inc., Englewood Cliffs, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/966,012

(22) PCT Filed: Feb. 12, 2019

(86) PCT No.: PCT/EP2019/053361
§ 371 (c)(1),
(2) Date: Jul. 30, 2020

(87) PCT Pub. No.: WO2019/162133
PCT Pub. Date: Aug. 29, 2019

(65) Prior Publication Data

US 2020/0377830 A1 Dec. 3, 2020

(30) Foreign Application Priority Data

| | | |
|---|---|---|
| Feb. 23, 2018 | (EP) | 18158256 |
| Feb. 23, 2018 | (EP) | 18158258 |
| Feb. 23, 2018 | (EP) | 18158260 |
| Feb. 23, 2018 | (EP) | 18158262 |
| Feb. 23, 2018 | (EP) | 18158264 |
| Feb. 23, 2018 | (EP) | 18158265 |
| Feb. 23, 2018 | (EP) | 18158266 |
| Feb. 23, 2018 | (EP) | 18158267 |
| Feb. 23, 2018 | (EP) | 18158268 |
| Feb. 23, 2018 | (EP) | 18158269 |
| May 23, 2018 | (EP) | 18158259 |

(51) Int. Cl.

| | |
|---|---|
| ***C11D 17/00*** | (2006.01) |
| ***C11D 1/02*** | (2006.01) |
| ***C11D 1/66*** | (2006.01) |
| ***C11D 3/20*** | (2006.01) |
| ***C11D 3/33*** | (2006.01) |
| ***C11D 3/37*** | (2006.01) |
| ***C11D 11/00*** | (2006.01) |
| ***C11D 17/04*** | (2006.01) |

(52) U.S. Cl.

CPC .............. *C11D 17/042* (2013.01); *C11D 1/02* (2013.01); *C11D 1/66* (2013.01); *C11D 3/2075* (2013.01); *C11D 3/2079* (2013.01); *C11D 3/2082* (2013.01); *C11D 3/2086* (2013.01); *C11D 3/33* (2013.01); *C11D 3/3761* (2013.01); *C11D 11/0082* (2013.01); *C11D 17/0065* (2013.01); *C11D 17/0091* (2013.01); *C11D 17/044* (2013.01); *C11D 2111/18* (2024.01)

(58) Field of Classification Search

None

See application file for complete search history.

(56) References Cited

U.S. PATENT DOCUMENTS

| | | | |
|---|---|---|---|
| 3,546,123 | A | 8/1970 | Stahlheber |
| 4,751,015 | A | 6/1988 | Humphreys et al. |
| 5,041,232 | A | 8/1991 | Batal et al. |
| 5,047,163 | A | 10/1991 | Batal et al. |
| 5,500,153 | A | 3/1996 | Figueroa et al. |
| 8,048,838 | B2 | 11/2011 | Witteler et al. |
| 8,183,196 | B2 | 5/2012 | Somerville Roberts et al. |
| 8,198,228 | B2 | 6/2012 | Tjelta et al. |
| 8,440,601 | B2 | 5/2013 | Seebeck et al. |
| 10,023,826 | B2 | 7/2018 | De Poortere et al. |
| 2005/0148488 | A1 | 7/2005 | Jekel et al. |
| 2009/0176688 | A1 | 7/2009 | Tjelta |
| 2010/0022430 | A1 | 1/2010 | Gould et al. |
| 2010/0081599 | A1 | 4/2010 | Preuschen et al. |
| 2011/0263472 | A1 | 10/2011 | Somerville Roberts et al. |

(Continued)

FOREIGN PATENT DOCUMENTS

| | | |
|---|---|---|
| CN | 1150450 | 5/1997 |
| CN | 1977036 | 6/2007 |

(Continued)

OTHER PUBLICATIONS

Li Dongguang; .; Handbook of Raw Materials for Detergent Cosmetics, First Ed.; 2002; 210-212 (total of 4 pages). Original & English translation abstract.

(Continued)

*Primary Examiner* — Lorna M Douyon

(74) *Attorney, Agent, or Firm* — N.V. Nederlandsch Octrooibureau

(57) ABSTRACT

The application relates to a shaped detergent product comprising 10-100 wt. % of a solid amorphous phase and 0-90 wt. % of one or more other solid phases, wherein the solid amorphous phase comprises 25-88 wt. % free acid equivalent of aminopolycarboxylate, 10-60 wt. % free acid equivalent of an acid, wherein the acid is not an aminopolycarboxylate and 2-30 wt. % water and wherein the shaped detergent product contains at least 0.5 wt. % surfactant.

15 Claims, 2 Drawing Sheets

(56) References Cited

U.S. PATENT DOCUMENTS

| | | | |
|---|---|---|---|
| 2011/0263473 A1* | 10/2011 | Somerville Roberts ..................... C11D 7/3245 510/229 | |
| 2011/0263474 A1 | 10/2011 | Roberts et al. | |
| 2012/0014925 A1 | 1/2012 | Kumada et al. | |
| 2012/0067373 A1 | 3/2012 | Souter et al. | |
| 2012/0149625 A1 | 6/2012 | Simonsen et al. | |
| 2012/0165237 A1 | 6/2012 | Silvernail | |
| 2012/0252708 A1 | 10/2012 | Van Lare et al. | |
| 2013/0102514 A1 | 4/2013 | Hueffer et al. | |
| 2013/0102516 A1 | 4/2013 | Huffer | |
| 2013/0102517 A1* | 4/2013 | Somerville-Roberts ..................... C11D 7/10 510/220 | |
| 2013/0284210 A1 | 10/2013 | Hueffer et al. | |
| 2013/0284211 A1 | 10/2013 | Garcia Marcos et al. | |
| 2013/0288941 A1 | 10/2013 | Hueffer et al. | |
| 2016/0024440 A1 | 1/2016 | Simonsen et al. | |
| 2016/0312163 A1 | 10/2016 | Somerville-Roberts et al. | |
| 2017/0218305 A1 | 8/2017 | Yumioka | |
| 2017/0283748 A1 | 10/2017 | Caires | |
| 2017/0321164 A1* | 11/2017 | Kropf ...................... C11D 3/28 | |
| 2017/0369819 A1* | 12/2017 | De Buzzaccarini ... C11D 3/395 | |
| 2019/0345420 A1* | 11/2019 | Kurth .................. C11D 17/045 | |

FOREIGN PATENT DOCUMENTS

| | | |
|---|---|---|
| CN | 101253257 | 8/2008 |
| CN | 101663386 | 3/2010 |
| CN | 104350139 | 2/2015 |
| CN | 105189724 | 12/2015 |
| CN | 105308165 | 2/2016 |
| CN | 105992813 | 10/2016 |
| CN | 106574211 | 4/2017 |
| CN | 107580591 | 1/2018 |
| CN | 106687572 | 5/2021 |
| DE | 19937345 | 2/2001 |
| EP | 0012463 | 6/1980 |
| EP | 0070074 | 1/1983 |
| EP | 0087702 | 9/1983 |
| EP | 0328177 | 8/1989 |
| EP | 0384070 | 8/1990 |
| EP | 0458397 | 11/1991 |
| EP | 0678572 | 10/1995 |
| EP | 1156101 | 11/2001 |
| EP | 1182217 | 2/2002 |
| EP | 1197546 | 4/2002 |
| EP | 1405902 | 4/2004 |
| EP | 1574563 | 9/2005 |
| EP | 1953215 | 1/2008 |
| EP | 2245129 | 11/2010 |
| EP | 2392638 | 12/2011 |
| EP | 2851417 | 3/2015 |
| EP | 2558560 | 10/2015 |
| EP | 3050947 | 8/2016 |
| EP | 3124586 | 2/2017 |
| EP | 2768935 | 11/2017 |
| EP | 2885391 | 1/2018 |
| EP | 3138895 | 10/2018 |
| JP | 2000143594 | 5/2000 |
| JP | 2013525546 | 6/2013 |
| JP | 2014530290 | 11/2014 |
| JP | 2016525153 | 8/2016 |
| JP | 2016530348 | 9/2016 |
| JP | 2017119742 | 7/2017 |
| JP | 2020501934 | 12/2017 |
| JP | 2020509134 | 3/2020 |
| JP | 2020523567 | 8/2020 |
| WO | WO9529216 | 11/1995 |
| WO | WO199924548 | 5/1999 |
| WO | WO0012463 | 3/2000 |
| WO | WO0112768 | 2/2001 |
| WO | WO2001085895 | 11/2001 |
| WO | WO2002068352 | 9/2002 |
| WO | WO2003097785 | 11/2003 |
| WO | WO2005003274 | 1/2005 |
| WO | WO2006027086 | 3/2006 |
| WO | WO2006032327 | 3/2006 |
| WO | WO2006032397 | 3/2006 |
| WO | WO2006045275 | 7/2006 |
| WO | WO2008009521 | 1/2008 |
| WO | WO2008017570 | 2/2008 |
| WO | WO2008087497 | 7/2008 |
| WO | WO2008125451 | 10/2008 |
| WO | WO2008141880 | 11/2008 |
| WO | WO2009024780 | 2/2009 |
| WO | WO2009092699 | 7/2009 |
| WO | WO2003074095 | 9/2009 |
| WO | WO2009132870 | 11/2009 |
| WO | WO2009141173 | 11/2009 |
| WO | WO2010099997 | 9/2010 |
| WO | WO2010102861 | 9/2010 |
| WO | WO2010112793 | 10/2010 |
| WO | WO2010148624 | 12/2010 |
| WO | WO2011011799 | 1/2011 |
| WO | WO2011076769 | 6/2011 |
| WO | WO2011133462 | 10/2011 |
| WO | WO2011133484 | 10/2011 |
| WO | WO2012000914 | 1/2012 |
| WO | WO2012043859 | 4/2012 |
| WO | WO2012168739 | 12/2012 |
| WO | WO2013056965 | 4/2013 |
| WO | WO2013056996 | 4/2013 |
| WO | WO2013059422 | 4/2013 |
| WO | WO2014086662 | 6/2014 |
| WO | WO2014161786 | 10/2014 |
| WO | WO2014191199 | 12/2014 |
| WO | WO2014206781 | 12/2014 |
| WO | WO2015000744 | 1/2015 |
| WO | WO2015086474 | 6/2015 |
| WO | WO2015121170 | 8/2015 |
| WO | WO2015124384 | 8/2015 |
| WO | WO2016180607 | 11/2016 |
| WO | WO2017019271 | 2/2017 |
| WO | WO2017067841 | 4/2017 |
| WO | WO2017080880 | 5/2017 |
| WO | WO2017097637 | 6/2017 |
| WO | WO2017100450 | 6/2017 |
| WO | WO2017102483 | 6/2017 |
| WO | WO2018005457 | 1/2018 |
| WO | WO2018007298 | 1/2018 |
| WO | WO2018011027 | 1/2018 |
| WO | WO2018138120 | 8/2018 |
| WO | WO2019162132 | 8/2019 |
| WO | WO2019162133 | 8/2019 |

OTHER PUBLICATIONS

Experimental Report; Aug. 2, 2022.

MG DA technical brochure, Dissolvine® M-40 Dissolvine® M-S, Nouryon, 2020; 2020; 20.

Yohana et al; CFD Analysis of Water Content and Minimum Droplet Temperature of Spray Drying Product with Inlet Temperature and Air Flow Direction Variation; Original Paper; pp. 1-3; 2022; 2022; 1-3.

Handbook of Industrial Spray Drying Systems; Chapt 10; 2006; 2006; 1-2.

* cited by examiner

SHAPED DETERGENT PRODUCT COMPOSITION COMPRISING AMINOPOLYCARBOXYLATE

FIELD OF THE INVENTION

The present invention relates to a shaped detergent product. Particularly, the present invention relates to a shaped detergent product comprising a solid amorphous phase which comprises aminopolycarboxylate and water.

BACKGROUND OF THE INVENTION

Detergent products typically contain several different active components, including builders, surfactants, enzymes and bleaching agents. Surfactants are employed to remove stains and soil and to disperse the released components into the cleaning liquid. Enzymes help to remove stubborn stains of proteins, starch and lipids by hydrolyzing these components. Bleach is used to remove stains by oxidizing the components that make up these stains. In order to reduce the negative effects of in particular calcium and magnesium ions on stain/soil removal so called 'builders' (complexing agents) are commonly applied in detergent products.

Shaped detergent products are known in the art. Detergent tablets are an example of a shaped detergent product. Tablets typically comprise a mixture of components that are solid at room temperature and components that are liquid at room temperature. The solid components are usually present in granular form for ease of processing and speed of dissolution/dispersion. The tablets are normally prepared by admixture of the tablet components followed by compaction to a shaped body.

Shaped detergent products in the form of multi-phase tablets are also known in the art. These multi-phase tablets contain one or more component formulations commonly present in a layered arrangement/body with insert formation. The component formulations contained in multi-phase tablets are usually composed of opaque, compressed materials.

Phosphorous based builders have been used for many years in a wide variety of detergent products. Some of the phosphorus based builders, such as trisodium phosphate and sodium tripolyphospate (STPP), have set a benchmark in the dishwasher detergent industry as having excellent performance. As such, phosphorus-containing builder components are generally considered to be "high-performance" builders. The use of phosphorous based builders in detergent products has led to environmental problems such as eutrophication. To curtail such problems many jurisdictions have, or are in the process of, issuing laws and regulations to restrict the maximum amount of phosphorous in detergent products. As such there has been a need for more environmentally friendly alternative builders, which have on-par effectiveness and which are also cost-effective. Examples of such alternative builders are aminopolycarboxylates, such as glutamic acid N,N-diacetic acid (GLDA), methylglycinediacetic acid (MGDA) and ethylenediaminetetraacetic acid (EDTA). A drawback of many of such aminopolycarboxylates is that they tend to be hygroscopic.

WO 2014/086662 discloses a solid GLDA (i.e. a aminopolycarboxylate) material comprising a combination of GLDA, sulphuric acid and sodium sulfate crystals. Also described is a process of producing a solid GLDA composition comprising the consecutive steps of:

combining a GLDA sodium salt and sulfuric acid in a high-water activity phase; and allowing water to evaporate from said phase to produce a precipitate.

It would be desirable to have available shaped detergent products comprising solid aminopolycarboxylate that provide one or more important product benefits, such as attractive appearance, improved stability and improved dissolution/dispersion properties.

It is an object of the present invention to provide a shaped detergent product containing aminopolycarboxylate that provides such benefits.

SUMMARY OF THE INVENTION

The above objective is achieved, in a first aspect of the invention, by a shaped detergent product comprising 10-100 wt. % of a solid amorphous phase and 0-90 wt. % of one or more other solid phases, said solid amorphous phase comprising:

25-88 wt. % free acid equivalent of aminopolycarboxylate;

10-60 wt. % free acid equivalent of an acid, said acid not being an aminopolycarboxylate;

2-30 wt. % water;

wherein the shaped detergent product contains at least 0.5 wt. % surfactant.

It was unexpectedly discovered that it is possible to prepare a shaped detergent product containing a solid amorphous phase that comprises aminopolycarboxylate and water. This amorphous phase can be provided in translucent or even transparent form. Even further advantageously, the amorphous phase can be glossy. Very attractive shaped detergent products can be produced by incorporating such a translucent solid amorphous phase as a visible element.

The aforementioned solid amorphous phase can also suitably be applied as an external, optionally transparent, coating of the shaped detergent product.

It was found that it is possible to incorporate a significant amount of acid in the solid amorphous phase of the shaped detergent product whilst retaining amorphicity. Inclusion of acid significantly reduces hygroscopicity of the solid amorphous phase. In addition, acids such a citric acid can be incorporated in the solid amorphous phase as an additional builder component.

It was unexpectedly discovered that a solid amorphous phase containing aminopolycarboxylate, acid and water can be prepared from an aqueous solution containing aminopolycarboxylate, acid and at least 35 wt. % water by reducing the water content of the solution to 30 wt. % or less to produce a liquid desiccated mixture whilst keeping the liquid mixture at a temperature of at least 50 degrees Celsius, followed by cooling of the desiccated mixture to a temperature of less than 25 degrees Celsius to obtain the solid amorphous phase.

Although the inventors do not wish to be bound by theory, it is believed that the desiccated liquid that is formed by reducing the water content of the solution to 30 wt. % or less is an amorphous material in its viscous (or rubbery) state. By cooling the desiccated liquid, the viscosity increases to a level where the material becomes solid.

In case the desiccated liquid is cooled to a temperature lower than its glass transition temperature, a hard solid can be obtained. This process offers the advantage that it allows the production of the solid amorphous material in the form of (shaped) pieces. Furthermore, the process can be used to coat a solid substrate with the solid amorphous material by coating the substrate with the hot liquid desiccated mixture and allowing the hot mixture to cool down.

DETAILED DESCRIPTION

Definitions

Figure 3:
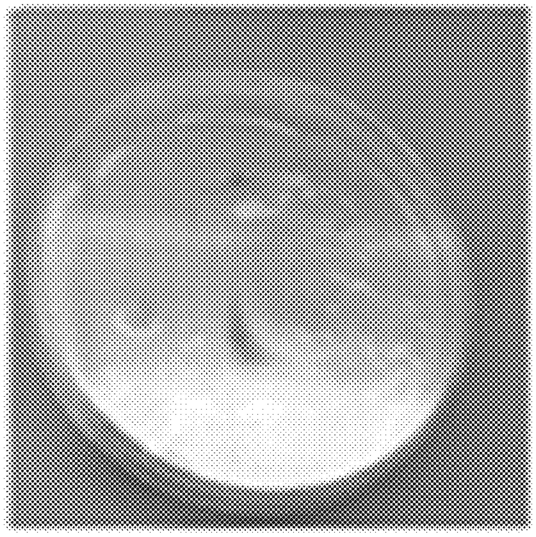
FIG. 3: photograph of the solid amorphous phase of Example 3.

Weight percentage (wt. %) is based on the total weight of the shaped detergent product or of the solid amorphous phase as indicated, unless otherwise stated. It will be appreciated that the total weight amount of ingredients will not exceed 100 wt. %. Whenever an amount or concentration of a component is quantified herein, unless indicated otherwise, the quantified amount or quantified concentration relates to said component per se, even though it may be common practice to add such a component in the form of a solution or of a blend with one or more other ingredients. It is furthermore to be understood that the verb "to comprise" and its conjugations is used in its non-limiting sense to mean that items following the word are included, but items not specifically mentioned are not excluded. Finally, reference to an element by the indefinite article "a" or "an" does not exclude the possibility that more than one of the elements is present, unless the context clearly requires that there be one and only one of the elements. The indefinite article "a" or "an" thus usually means "at least one". Unless otherwise specified all measurements are taken at standard conditions. Whenever a parameter, such as a concentration or a ratio, is said to be less than a certain upper limit it should be understood that in the absence of a specified lower limit the lower limit for said parameter is 0.

The term 'distinctive' as used herein in relation to the solid amorphous phase means that this phase is visually distinct/distinguishable by the untrained human eye.

The term 'aminopolycarboxylate' includes its partial and full acids unless otherwise specified. The salts, rather than the full acids, of the aminopolycarboxylates are more preferred, and particularly preferred are the alkali salts thereof.

The term 'acid' includes partial or full alkali salts thereof unless otherwise specified.

Concentrations expressed in wt. % of 'free acid equivalent' refer to the concentration of an aminopolycarboxylate or an acid expressed as wt. %, assuming that the aminopolycarboxylate of acid is exclusively present in fully protonated from. The following table shows how the free acid equivalent concentrations can be calculated for some (anhydrous) am inopolycarboxylates and (anhydrous) acid salts.

| | Wt. % salt | Conversion factor | Wt. % free acid equivalent |
|---|---|---|---|
| GLDA (tetrasodium salt) | 50 | 263.1/351.1 | 37.5 |
| MGDA (trisodium salt) | 50 | 205.1/271.1 | 37.8 |
| Citric acid (monosodium salt) | 50 | 192.1/214.1 | 44.9 |
| Sodium acetate | 50 | 60.0/82.0 | 36.6 |

The term 'translucency' as used herein refers to the ability of light in the visible spectrum to pass through the first solid phase, at least in part. To quantify, preferably it is evaluated based on a path-length of 0.5 cm through the first solid phase, measuring the amount of light passing through. The first solid phase of the shaped detergent product is deemed to be translucent if under the aforementioned measurement conditions within the wavelength range of 400 to 700 nm it has a maximum Transmittance of at least 5%. The first solid phase is deemed to be transparent if within the aforementioned wavelength range it has a maximum Transmittance of at least 20%. Here the Transmittance is defined as the ratio between the light intensity measured after the light has passed through the sample of first solid phase and the light intensity measured when the sample has been removed.

The solid amorphous phase may contain a small quantity of (homogenously dispersed) non-amorphous material (e.g. impurities), but preferably this amount is below 5 wt. %, more preferably below 2 wt. %, even more preferably below 1 wt. %, the weight being based on the total amount of solid amorphous phase, and most preferably is essentially absent.

Gloss is the fraction of light that is reflected in a specular (mirror-like) direction. The angle of the incident light at which gloss is measured is 20 degrees to obtain a measurement for 'high gloss finish', 60 degrees for 'mid gloss finish' and 85 degrees for 'matt finish'. Good gloss attributes provides better visual appeal and cue's glass cleaning performance of the solid amorphous phase. These gloss values are measured using a Rhopoint IQ (Goniophotometer; Supplier Rhopoint Instruments) according to supplier instructions. To measure glossiness of the solid amorphous phase, this is done on an (isolated, continuous) sample of the solid amorphous phase, having a thickness of 0.5 cm, a flat smooth surface (e.g. shaped like a disk or plate) and using white paper as background (100% recycled paper, bright white; Supplier: Office Depot).

Advantageously, the solid amorphous phase has the following gloss properties to provide even better visual appeal:

- A specular reflectance at 20 degrees of incident light of at least 5%, 10%, 15%, 20%, 25%, 30%, 35%, 40%, 45%, 50%, 55% and even more preferably at least 60%. Preferably the reflectance at 20 degrees of at most 95%, 90%, 85%, 80% and more preferably at most 75%. The most advantageous reflectance at 20 degrees being from 40 to 85%, more preferably from 50 to 80% and even more preferably from 55 to 75%.
- A specular reflectance at 60 degrees of incident light of at least 5%, 10%, 15%, 20%, 25%, 30%, 35%, 40%, 45%, 50%, 55%, 60%, 65%, 70%, 75%, 80%, 85%. Preferably the reflectance at 60 degrees of at most 99.5%, 99.0%, 98.5% and more preferably 98.0%. The most advantageous reflectance at 60 degrees being from 50 to 99.5%, more preferably from 70 to 99.0% and even more preferably from 80 to 98.5%.
- A specular reflectance at 85 degrees of incident light of at least 5%, 10%, 15%, 20%, 25%, 30%, 35%, 40%, 45%, 50%, 55% and even more preferably at least 60%. Preferably the reflectance at 85 degrees of at most 95%, 90%, 85%, 80% and more preferably at most 75%. The most advantageous reflectance at 85 degrees being from 40 to 85%, more preferably from 50 to 80% and even more preferably from 55 to 75%. Of course even more advantageously the solid amorphous phase has the preferred reflectance at 20, 60 and 85 degrees in combination (i.e. has a good high gloss finish and a good mid gloss finish and a good matt finish).

Aminopolycarboxylate

Aminopolycarboxylates are well known in the detergent industry and sometimes referred to as aminocarboxylate chelants. They are generally appreciated as being strong builders.

In accordance with a preferred embodiment, the aminopolycarboxylate employed in accordance with the present invention is a chiral aminopolycarboxylate. Chirality is a geometric property of molecules induced by the molecules having at least one chiral centre. Chiral molecules are non-superimposable on its mirror image. The chiral aminopolycarboxylate as used in the invention can comprise all its molecular mirror images.

Chiral and preferred aminopolycarboxylates are glutamic acid N,N-diacetic acid (GLDA), methylglycinediacetic acid (MGDA), ethylenediaminedisuccinic acid (EDDS), iminodisuccinic acid (IDS), iminodimalic acid (IDM) or a mixture thereof, more preferred are GLDA, MGDA, EDDS or a mixture thereof and even more preferred are GLDA and MGDA or a mixture thereof. Preferably the aminopolycarboxylate as used in the solid amorphous phase essentially is GLDA and/or MGDA. The chiral aminopolycarboxylate can be a mixture of chiral aminopolycarboxylates. In case of GLDA preferably is it predominantly (i.e. for more than 80 molar %) present in one of its chiral forms.

Examples of non-chiral aminopolycarboxylates are ethylenediaminetetraacetic acid (EDTA), nitrilotriacetic acid (NTA), iminodiacetic acid (IDA), diethylenetriaminepentaacetic acid (DTPA), hydroxyethyliminodiacetic acid (HEIDA) aspartic acid diethoxysuccinic acid (AES) aspartic acid-N,N-diacetic acid (ASDA), hydroxyethylene-diaminetetraacetic acid (HEDTA), hydroxyethylethylene-diaminetriacetic acid (HEEDTA), iminodifumaric (IDF), iminoditartaric acid (IDT), iminodimaleic acid (IDMAL), ethylenediaminedifumaric acid (EDDF), ethylenediaminedimalic acid (EDDM), ethylenediamineditartaric acid (EDDT), ethylenediaminedimaleic acid and (EDDMAL), dipicolinic acid. None-chiral aminopolycarboxylates are preferably present in an amount of at most 10 wt. %, more preferably at most 5 wt. % and even more preferably essentially absent from the solid amorphous phase of the shaped detergent product of the invention.

The solid amorphous phase of the invention preferably comprises from 30 to 70 wt. % free acid equivalent of aminopolycarboxylate. More preferably, the aminopolycarboxylate content is from 32 to 68 wt. % free acid equivalent and even more preferably from 35 to 60 wt. % free acid equivalent.

In a preferred embodiment, the amorphous phase contains at least 25 wt. %, more preferably at least 30 wt. %, even more preferably at least 35 wt. % free acid equivalent of GLDA, MGDA, EDDS, IDS, IDM or mixtures thereof. In another preferred embodiment, the amorphous phase contains at least 25 wt. %, more preferably at least 30 wt. %, even more preferably at least 35 wt. % free acid equivalent of aminopolycarboxylate of GLDA, MGDA, EDDS or mixtures thereof.

Acid

The solid amorphous phase of the present invention comprises an acid, said acid not being an aminopolycarboxylate.

As explained herein before, it was unexpectedly discovered that it is possible to prepare a solid amorphous phase containing aminopolycarboxylate, water and acid. This solid amorphous phase was found to be free of crystals of the aminopolycarboxylate and of the acid, as measured by WAXS using the method set-out in the Examples. Without wishing to be bound by theory, it is believed that the molecular interaction of the aminopolycarboxylate with the acid (although not covalently bound to it) prevents either of these components from crystallizing. Thus, another benefit of the composition according to the invention is that the composition can be free of further added crystal formation inhibitors.

In a preferred embodiment, the acid is an organic acid. The organic acid used in the solid amorphous phase according to the invention can be any organic acid. Particularly good results were achieved with organic acids being polyacids (i.e. acids having more than one carboxylic acid group), and more particularly with organic acids which are di- or tri-carboxylates.

The organic acid employed in accordance with the invention preferably comprises 3 to 25 carbon atoms, more preferably 4 to 15 carbon atoms.

In general, any organic acid can be used, but in view of consumer acceptance the organic acids preferably are those which are also found naturally occurring, such as in plants. As such, organic acids of note are acetic acid, citric acid, aspartic acid, lactic acid, adipic acid, succinic acid, glutaric acid, malic acid, tartaric acid, maleic acid, fumaric acid, saccharic acids, their salts, or mixtures thereof. Of these, of particular interest are citric acid, aspartic acid, acetic acid, lactic acid, succinic acid, glutaric acid, adipic acid, gluconic acid, their salts, or mixtures thereof. Citric acid, lactic acid, acetic acid and aspartic acid are even more preferred. Citric acid and/or its salt are especially beneficial as, besides acting as builder are also highly biodegradable. As such the more preferred solid amorphous phase of the invention comprises (and essentially is) citric acid, citrate salt or a mixture thereof. In general, the acids of the organic acids are more preferred than their alkali salt equivalents.

In a preferred embodiment, the solid amorphous phase comprises from 15 to 55 wt. % free acid equivalent of the acid. More preferred is a total amount of the acid of from 20 to 52 wt. % free acid equivalent, more preferably of from 25 to 50 wt. % free acid equivalent.

Better results were achieved with certain weight ratios of aminopolycarboxylate and the acid in the solid amorphous phase. Therefore, it is preferred that the weight ratio of aminopolycarboxylate to acid is from 1:2 to 1:0.15, preferably from 1:1.5 to 1:0.4, more preferably from 1:1.4 to 1:0.5, based on the weight of the free acid equivalents.

Preferably, the solid amorphous phase contains at least 10 wt. %, more preferably at least 15 wt. %, even more preferably at least 20 wt. %, most preferably at least 25 wt. % free acid equivalent of an acid selected from acetic acid, citric acid, aspartic acid, lactic acid, adipic acid, succinic acid, glutaric acid, malic acid, tartaric acid, maleic acid, fumaric acid, saccharic acids, sulfuric acid, hydrochloric acid and combinations thereof.

In a particularly preferred embodiment, the amorphous phase contains at least 10 wt. %, more preferably at least 15 wt. %, even more preferably at least 20 wt. %, most preferably at least 25 wt. % free acid equivalent of a di- and/or tri-carboxylic acid having a molecular weight of less than 500 Dalton, more preferably of less than 400 Dalton and most preferably of less than 300 Dalton.

In a particularly preferred embodiment of the invention, the amorphous phase contains at least 10 wt. %, more preferably at least 15 wt. %, even more preferably at least 20 wt. %, most preferably at least 25 wt. % free acid equivalent of citric acid.

The most preferred combinations of aminopolycarboxylate and acid comprise a chiral aminopolycarboxylate and an organic acid.

Particularly preferred are combinations comprising GLDA and citric acid; or MGDA and citric acid.

It was found that the solid amorphous phase of the present invention can be rendered substantially more plastic (less solid) by heating the amorphous phase to a temperature of at least 50 degrees Celsius. This thermoplastic behaviour can suitably be used in the preparation of the shaped detergent product, e.g. by introducing the plasticized amorphous phase into a mould and solidifying the plasticized amorphous phase within the mould by cooling. Also, the plasticized amorphous phase may be spread as a layer onto a solid substrate followed by cooling to solidify the layer of amorphous phase.

Water

The solid amorphous phase of the shaped detergent product comprises from 2 to 30 wt. % of water. It was surprisingly found that such a water content provides a solid amorphous phase with a good balance of hardness and plasticity. Depending on the water level the solid amorphous phase can be a hard solid (water level of from 2 to 20 wt. %), or a soft solid (water level above 20 to 30 wt. %). In general, the solid amorphous phase having a water level from 2 to 30 wt. % is generally plastic (more so at higher water levels). This offers the significant practical advantage that the solid amorphous phase can be more easily (factory machine) worked with a low chance of breakage or forming cracks. Also, not unimportantly, it can provide an improved sensory experience when handled by the consumer. Better results were achieved with from 5 to 25 wt. % of water and better ones still with from 6 to 20 wt. % of water. The latter ranges provide a further optimum between suitable hardness, reduced brittleness and plasticity.

The water-activity $a_w$ of the solid amorphous phase can be 0.7 of lower. Preferred is a water-activity $a_w$ of at most 0.6, and further preferred of at most 0.5. As to preferred lower limits of water activity $a_w$ this may be 0.15.

pH Profile

The solid amorphous phase of the invention preferably has the following pH profile: the pH of a solution of the solid amorphous phase made by dissolving the solid amorphous phase in water in a 1:1 weight ratio is at most 10.0, as measured at 25 degrees Celsius. Such a pH profile improves stability of the solid amorphous phase. Particularly good results were achieved for said pH profile being at most 9.0, more preferably at most 8.0. Many detergents products are overall alkaline. As such, for practical reasons and to increase formulation freedom, preferably the pH of a solution made by dissolving 1 wt. % of the solid amorphous phase in water is at least 5.0 and more preferably at least 6.0 and most preferably at least 6.5.

Further Ingredients

The solid amorphous phase of the invention may comprise further ingredients, such as further detergent active components.

Particularly good results were observed when polycarboxylate polymer was further comprised by the solid amorphous phase in an amount of from 1 to 50 wt. %, the weight being based on the free-acid equivalent. The term "polycarboxylate polymer" here is used to also cover the acid form and is different from the acid that is present in the solid amorphous phase. The addition of polycarboxylate polymer was shown to surprisingly further improve the plasticity of the solid amorphous phase as well as raise the glass transition temperature ($T_g$) of the solid amorphous phase. The improved plasticity is beneficial as it makes the solid amorphous phases easier to (mechanically) work and makes it easier to manufacture detergent product comprising the solid amorphous phase. A higher glass transition temperature is beneficial as it aids stability of the solid amorphous phase during storage and handling, in particular in view of temperature stresses. That being said a glass transition temperature which is not too high will aid quick dissolution of the product in warm water as it helps to liquefy the solid amorphous phase during use by increasing surface area.

Preferably, the glass transition temperature ($T_g$) of the solid amorphous phase is less than 80 degrees Celsius, more preferably from 10 to 60 degrees Celsius, even more preferably from 15 to 50 degrees Celsius and most preferably from 20 to 40 degrees Celsius. Further improvements were observed when the solid amorphous phase comprised from 1.5 to 15 wt. % of polycarboxylate polymer and still more preferred is an amount of from 1.8 to 8 wt. %, as based on the free-acid equivalent.

Suitable polycarboxylate polymers have an average molar mass Mw of from 500 to 500.000. They may be modified or unmodified, but preferably are unmodified. Also they can be co-polymers or homopolymers, although homopolymers are considered more beneficial.

Surprisingly, it was observed that if the solid amorphous phase of the shaped detergent product comprised polycarboxylate polymer, hygroscopicity was reduced. This reduction was more pronounced if the polycarboxylate polymer used was of lower molecular weight. Having a reduced hygroscopicity is of course beneficial as it aids in improving the stability of the shaped detergent product, and generally increases shelf life. Polycarboxylate polymers having an average molar mass (Mw) of from 900 to 100.000, more preferably 1100 to 10.000 gave better results in terms of further improving the glass transition temperature ($T_g$), the plasticity and the hygroscopicity.

In a preferably, the solid amorphous phase comprises at least 0.3 wt. %, more preferably at least 0.6 wt. %, even more preferably at least 1 wt. % and most preferably at least 1.8 wt. % free acid equivalent of polycarboxylate polymer selected from polyacrylate, copolymers of polyacrylate, polymaleate, copolymers of polymaleate, polymethacrylate, copolymers of polymethacrylate, polymethyl-methacrylate, copolymers of polymethyl-methacrylate, polyaspartate, copolymers of polyaspartate, polylactate, copolymers of polylactate, polyitaconates, copolymers of polyitaconates and combinations thereof.

Highly preferred polycarboxylate polymers are polyacrylates. Suitable polyacrylates are commercially available, such as from BASF under the tradename Sokalan PA 13 PN, Solakan PA 15, Sokalan PA 20 PN, Sokalan PA 20, Sokalan PA 25 PN, Sokalan PA 30, Sokalan 30 CL, Sokalan PA 40, Sokalan PA 50, Sokalan PA 70 PN, Sokalan PA 80 S and Sokalan PA 110 S.

Preferred are polyacrylates which are partially or fully neutralized.

As such highly preferred for use in the solid amorphous phase of invention are polyacrylates having the following combined properties:

- present in an amount of from 2 to 25 wt. %, based on the free acid equivalent; and which are partially or fully neutralized; and
which have an average molar mass (Mw) of from 500 to 500.000; and
which are homopolymers.

Given the above it follows that still more preferred are polyacrylates having the following combined properties:
used in an amount of from 3 to 15 wt. %, based on the free acid equivalent; and
which are partially or fully neutralized; and
which have an average molar mass (Mw) of from 900 to 100.000; and
which are homopolymers.

The solid amorphous phase of the invention may, depending on the aminopolycarboxylate and acid used, be colored and for example have a yellowish tinge. The translucency of such solid amorphous phase can be further improved by adding an opposing colorant of the color wheel, which is preferably a dye. For example, yellow opposes blue on the color wheel, and violet opposes green. This will render the solid amorphous phase in essence to be more colorless, which can be preferred. It is noted that typical dyes need be added in relatively small amounts to be effective. Hence their level is suggested not to be above 0.5 wt. % and preferably is at most 0.2 wt. %.

The amorphous phase preferably contains not more than 30 wt. % of ingredients other than aminopolycarboxylate, acid, polyacrylate, colorants and water, more preferably no more than 20 wt. %, still even more preferably no more than 10 wt. %, still even more preferably no more than 5 wt. %, still even more preferably no more than 2 wt. % and still even more preferably essentially no further ingredients are present.

Process to manufacture the solid amorphous phase

Another aspect of the invention relates to a process of preparing the solid amorphous phase, said process comprising the steps of:
providing an aqueous solution of the aminocarboxylate and the one or more water-soluble components, said aqueous solution comprising:
5-45 wt. % free acid equivalent of aminopolycarboxylate;
2-40 wt. % of free acid equivalent of the acid;
at least 35 wt. % water;
removing water from the aqueous solution by evaporation at a temperature of at least 50° C. to produce a liquid desiccated mixture having a water content of not more than 30 wt. %; and
reducing the temperature of the desiccated mixture to less than 25° C. to obtain the solid amorphous phase.

The process to manufacture the solid amorphous phase according of the invention, has the benefit of being both simple, economical and omits the need for adding further crystal formation inhibitors.

The combining of the ingredients in the first step (i.e. Step I.) can be done in any order. The amount of water to be used in providing the aqueous solution beneficially is sufficient to fully dissolve the ingredients a) and b) at boiling temperature to simplify processing. Both the aminopolycarboxylate and the organic acid may be added as a separate pre-made aqueous solutions, which is preferred to further simplify processing. As indicated a preferred Step I. adds a) as (partially) alkali salt and b) as acid. Addition of extra water and/or application of heat may be required to fully dissolve the ingredients as precipitate may form when the aminopolycarboxylate is combined with acid.

Heat may be applied to (more quickly) dissolve the ingredients a) and b). Applying heat at Step I. is preferred as it not only reduces the time to dissolve (if necessary) the ingredients a) and b), as it may also reduce the amount of water needed to provide the solution, saving costs. Also having less water in the solution provided at Step I. can save time for completing Step II. of the process. Preferably at Step I. an aqueous solution is provided having a temperature of at least 50, more preferably of at least 70, even more preferably of at least 90 degrees Celsius and most preferably of at least 100 degrees Celsius.

The aqueous solution at Step I. should be homogenous at least in respects of the aminopolycarboxylate, the acid and the water. More preferably, the aqueous solution is completely homogeneous. As such it is particularly preferred that the aqueous solution of Step I. is subjected to physical mixing. The aqueous solution provided at Step I. may be viscous. Adding a lot of water at Step I. means more water needs to be removed at Step II. requiring additional time and/or energy. As such preferably the aqueous solution provided at Step I comprises from 40 to 93 wt. % of water, preferably from 45 to 85 wt. %.

The final solid amorphous phase is characterised by a pH profile of at most 10.0, based on an a solution of the solid amorphous phase in water in a 1:1 solid amorphous phase: water weight ratio, as measured at 25 degrees Celsius. This can be easily achieved by suitably adjusting the pH of the aqueous solution accordingly, preferably at Step I according to conventional means. For example, a balanced use of acid or (partially) neutralized salts forms of the ingredients a) and b) can be applied.

In the second step of the process (i.e. Step II.) water is removed from the aqueous solution provided at Step I. by evaporation at a temperature of at least 50 degrees Celsius, to provide a water content of from 2 to 30 wt. %. Preferably, water is removed from the aqueous solution by evaporation at a temperature of at least 70 degrees Celsius, more preferably at least 90 degrees Celsius and most preferably at least 100 degrees Celsius.

The preferred way of removing water at Step II. is by applying sufficient heat to bring the aqueous solution provided at Step I. to a boil. This allows fast water removal which is advantageous to obtain the benefits of the solid amorphous phase according to the invention. As such the water removal may be done by any suitable means but preferably is such that the water removal is on-par with boiling at otherwise standard ambient conditions or faster.

It is preferred that Step II. does not involve spray-drying. Spray-drying is considered to promote crystal formation and thus to reduce the translucency of the resulting solid amorphous phase.

In the third step of the process (i.e. Step III.) the temperature of the desiccated mixture is reduced to less than 25° C. to obtain a solid amorphous phase. Preferably the temperature is reduced to from 20 to 25 degrees Celsius. Step III. can be performed use passive or active cooling. Active cooling may be done using any conventional means such as by refrigeration.

In a particularly preferred Step III., the cooling of the desiccated mixture is achieved by heat exchange with the remainder of the detergent product parts. In this sense, it is particularly preferred that the 'solid amorphous phase' is applied in liquid/viscous form having an elevated temperature, onto the remainder of the detergent product and allowed to solidify in situ to (further) solidify.

Preferably the solid amorphous phase according to the invention is obtainable by the process according to the invention. Solid amorphous phase made according to the process of the inventions were shown to be highly beneficial in view of the indicated attributes.

Shaped Detergent Product

The term 'solid' according to the invention is according to its commonplace usage. For example, a wineglass is considered a solid in common place usage although in a strict physical sense it is an extremely viscous liquid.

Preferably, the solid amorphous phase that is present in the shaped detergent product is present in at least one continuous volume of from 0.1 to 20 $cm^3$, more preferably from 0.2 to 15 $cm^3$, even more preferably from 0.4 to 10 $cm^3$, most preferably from 0.5 to 5 $cm^3$. Said preferred volumes allows the distinctive solid amorphous phase of the invention to be easily visible to the naked eye, allowing it to be better appreciated for its visual appeal. The solid amorphous phase may be present in any suitable shape.

The solid amorphous phase preferably has a maximum Transmittance within the wavelength range of 400 to 700 nm of at least 5%, more preferably of at least 10%, even more preferably of at least 20%, yet more preferably of at least 25% and most preferably of least 30%. According to another preference, solid amorphous phase has an average Transmittance in the wavelength range of 400 to 700 nm of at least 5%, more preferably of at least 10%, even more preferably of at least 20% and most preferably of at least 25%.

The shaped detergent product of the invention comprises 10-100 wt. % of the solid amorphous phase and 0-90 wt. % of one or more other solid phases. It is preferred that the shaped detergent product comprises 10-90 wt. % of the solid amorphous phase and 10-90 wt. % of a second solid phase. Examples of shaped detergent products containing the solid amorphous phase in combination with a second solid phase are tablets that are coated with the solid amorphous phase. Another example are multi-layered tablets containing one or more layers of the solid amorphous phase and one or more layers of a second solid phase.

Preferably, the second solid phase is visually distinct from the solid amorphous phase. It is advantageous that the solid amorphous phase is translucent or transparent and the second solid phase is opaque.

Preferably, the shaped detergent product of the invention is a machine dish wash detergent product, a laundry detergent product or a toilet rim-block detergent product. Most preferably, the shaped detergent product is a machine dish wash detergent product.

In case of machine dish wash detergent products, the particularly preferred amount of the solid amorphous phase is from 5 to 60 wt. %, more preferably 10 to 50 wt. % and even more preferably 15 to 40 wt. %.

In case of laundry detergent products, the particularly preferred amount of the solid amorphous phase of the invention is from 10 to 60, more preferably 20 to 50 wt. %, and even more preferably, 25 to 35 wt. %.

In case of toilet bowl rim detergent products, the particularly preferred amount of the solid amorphous phase of the invention is from 10 to 85 wt. %, more preferably 20 to 80 wt. % and even more preferably 40 to 70 wt. %.

The distinctiveness of the solid amorphous phase of the shaped detergent product can be enhanced by a suitable distinctive colouring. This can be done by making it of more intense or of less intense colour (e.g. colourless). Preferably of course when colouring is applied, the translucency is maintained to an appreciable extent. Generally colourants, such as dyes and/or pigments are effective in low amounts and as such this is typically not problematic. In any case, it is particularly envisioned that the solid amorphous phase of the invention is used in a detergent product and adds to the visual appeal thereof.

The detergent product of the invention can be present in any suitable shape, such as in the shape of a tablet. The solid amorphous phase can be present in the detergent product of the invention in any suitable shape or shapes, such as in one or more layers, lines (e.g. rods, beams), spherical or cuboid shapes or combinations thereof.

Preferred shapes are the following: cuboid, cylinder, sphere, bar, X-bar, pyramid, prism, cone, dome and (circular) tube. Of these more preferred shapes are bar, X-bar, cylinder, cuboid, (circular) tube and sphere.

In a preferred embodiment, the shaped detergent product has a unit weight of 5 to 50 grams, more preferably a unit weight of 10 to 30 grams, even more preferably a unit weight of 12 to 25 grams.

Preferably, the shaped detergent product is a tablet.

Whatever the geometric arrangement of the detergent product, it is preferred that at least part the solid amorphous phase forms part of the surface of the detergent product. More preferably, at least 10%, 20%, 30%, 40% more preferably at least 50% of the surface area of the detergent product is formed by the solid amorphous phase. Preferably at most 95%, 90% and more preferably at most 85% of the surface area of the detergent product is formed by the solid amorphous phase.

The solid amorphous phase of the shaped detergent product may act as a matrix and hold part, or the whole, of the further ingredients in the detergent product. In this sense, the solid amorphous phase of the invention may be used to form translucent (partial) skin. Furthermore, and this is another preferred use, is that the solid amorphous phase acts as a translucent matrix holding distinct visually distinct bodies (e.g. spheres, cubes or other shapes, preferably sphere, more preferably coloured spheres). The bodies preferably being made from detergent actives.

In general, the skilled person is endowed with the capability to use the solid amorphous phase of the invention to his advantage when making more appealing detergent products. In particular the solid amorphous phase can be used to provide a (partially) translucent detergent product and/or to provide a (partially) glossy detergent product.

As described above, ways of using the solid amorphous phase in a detergent product in which the solid remains visible and can be appreciated for it translucent and/or glossy nature are highly preferred.

The detergent product according to the invention comprises the solid amorphous phase according to the invention. As such the detergent product (as a whole) will comprise aminopolycarboxylate, acid and water by virtue of this. The detergent product in addition comprises, preferably in the other part(s), at least one further detergent active, and preferably one or more of enzymes, enzyme stabilizers, bleaching agents, bleach activator, bleach catalyst, bleach scavengers, drying aids, silicates, metal care agents, colorants, perfumes, lime soap dispersants, anti-foam, anti-tarnish, anti-corrosion agents, surfactants and further builders.

Further Builders

Further builder materials may be selected from 1) calcium sequestrant materials, 2) precipitating materials, 3) calcium ion-exchange materials and 4) mixtures thereof. Examples of calcium sequestrant builder materials include alkali metal polyphosphates, such as sodium tripolyphosphate and organic sequestrants, such as ethylene diamine tetraacetic acid. Examples of precipitating builder materials include sodium orthophosphate and sodium carbonate. Preferably, the detergent product comprises sodium carbonate in the range from 5 to 50 wt. %, most preferably 10 to 35 wt. %.

Examples of calcium ion-exchange builder materials include the various types of water-insoluble crystalline or amorphous aluminosilicates, of which zeolites are the best known representatives, e.g. zeolite A, zeolite B (also known as zeolite P), zeolite C, zeolite X, zeolite Y and also the zeolite P-type as described in EP-A-0,384,070. The detergent product may also contain 0-65% of a builder or complexing agent such as ethylenediaminetetraacetic acid, diethylenetriamine-pentaacetic acid, alkyl- or alkenylsuccinic acid, nitrilotriacetic acid or the other builders mentioned below. Many builders are also bleach-stabilising agents by virtue of their ability to complex metal ions. Zeolite and carbonate (carbonate (including bicarbonate and sesquicarbonate) are preferred further builders.

The builder may be crystalline aluminosilicate, preferably an alkali metal aluminosilicate, more preferably a sodium aluminosilicate. This is typically present at a level of less than 15 wt. %. Aluminosilicates are materials having the general formula: 0.8-1.5 $M_2O$. $Al_2O_3$. 0.8-6 $SiO_2$, where M is a monovalent cation, preferably sodium. These materials contain some bound water and are required to have a calcium ion exchange capacity of at least 50 mg CaO/g. The preferred sodium aluminosilicates contain 1.5-3.5 $SiO_2$ units in the formula above. They can be prepared readily by reaction between sodium silicate and sodium aluminate, as amply described in the literature. The ratio of surfactants to alumuminosilicate (where present) is preferably greater than 5:2, more preferably greater than 3:1.

Alternatively, or additionally to the aluminosilicate builders, phosphate builders may be used. In this invention the term ‘phosphate’ embraces diphosphate, triphosphate, and phosphonate species. Other forms of builder include silicates, such as soluble silicates, metasilicates, layered silicates (e.g. SKS-6 from Hoechst). However, preferably the detergent product is a non-phosphate built detergent product, i.e., contains less than 1 wt. % of phosphate and preferably essentially no phosphate.

In view of the environmental concerns associated with the use of high levels of phosphorous based builders in detergent compositions it is preferred that the detergent product according to the invention comprises at most 5 wt. %, more preferably at most 1 wt. % and particularly essentially no phosphorous based builders. Examples of phosphorous based builders are 1-hydroxyethane-1,1-diphosphonic acid (HEDP), diethylenetriamine-penta (methylenephosphonic acid) (DTPMP), ethylenediaminetetra-methylenephosphonate (EDTMP), tripolyphosphate, pyrophosphate.

Alkali carbonate is appreciated in view of its double-function as builder and buffer and is preferably present in the detergent product. If present the preferred amount of alkali carbonate in the detergent product is from 2 to 75 wt. %, more preferably from 3 to 50 wt. % and even more preferably from 5 to 20 wt. %. Such level of alkali carbonate provides good $Ca^{2+}$ and $Mg^{2+}$ ion scavenging for most types of water hardness levels, as well as other builder effects, such as providing good buffering capacity. The preferred alkali carbonates are sodium- and/or potassium carbonate of which sodium carbonate is particularly preferred. The alkali carbonate present in the detergent product of the invention can be present as such or as part of a more complex ingredient (e.g. sodium carbonate in sodium percarbonate).

Surfactant

The shaped detergent product of the invention comprises 0.5 wt. % surfactant, preferably 1 to 70 wt. %, more preferably 2 to 50 wt. % of surfactant. The surfactant can be non-ionic or anionic.

In case of machine dish wash detergent products, the particularly preferred amount of surfactant is from 0.5 to 25 wt. %, preferably 2 to 15 wt. %. In case of toilet bowl rim detergent products, the particularly preferred amount of surfactant is from 0.5 to 55 wt. %, preferably 10 to 40 wt. %. In case of laundry detergent products, the particular preferred amount of surfactant is from 2 to 70 wt. %, preferably 10 to 35 wt. %.

The nonionic and anionic surfactants of the surfactant system may be chosen from the surfactants described “Surface Active Agents” Vol. 1, by Schwartz & Perry, Interscience 1949, Vol. 2 by Schwartz, Perry & Berch, Interscience 1958, in the current edition of “McCutcheon's Emulsifiers and Detergents” published by Manufacturing Confectioners Company or in “Tenside-Taschenbuch”, H. Stache, 2nd Edn., Carl Hauser Verlag, 1981. Preferably the surfactants used are saturated.

Non-Ionic Surfactants

Suitable non-ionic surfactants which may be used include, in particular, the reaction products of compounds having a hydrophobic group and a reactive hydrogen atom, for example, aliphatic alcohols, acids, amides or alkyl phenols with alkylene oxides, especially ethylene oxide either alone or with propylene oxide.

Preferably low-foaming nonionic surfactants are used particularly from the group of alkoxylated alcohols. Alkoxylated, advantageously ethoxylated, in particular primary alcohols with preferably 8 to 18 C atoms and on average 1 to 12 mol of ethylene oxide (EO) per mol of alcohol, in which the alcohol residue may be linear or preferably methyl-branched in position 2 or may contain linear and methyl-branched residues in the mixture, as are usually present in oxo alcohol residues, are preferably used as nonionic surfactants. In particular, however, alcohol ethoxylates with linear residues prepared from alcohols of natural origin with 12 to 18 C atoms, for example from coconut, palm, tallow fat or oleyl alcohol, and on average 2 to 8 mol of EO per mol of alcohol are preferred. The preferred ethoxylated alcohols include for example $C_{12-14}$ alcohols with 3 EO to 4 EO, $C_{9-12}$ alcohol with 7 EO, $C_{13-15}$ alcohols with 3 EO, 5 EO, 7 EO or 8 EO, $C_{12-18}$ alcohols with 3 EO, 5 EO or 7 EO and mixtures of these, such as mixtures of $C_{12-14}$ alcohol with 3 EO and $C_{12-19}$ alcohol with 5 EO. Preferred tallow fatty alcohols with more than 12 EO have from 60 to 100 EO, and more preferably from 70 to 90 EO. Particularly preferred tallow fatty alcohols with more than 12 EO are tallow fatty alcohols with 80 EO.

Nonionic surfactants from the group of alkoxylated alcohols, particularly preferably from the group of mixed alkoxylated alcohols and in particular from the group of EO-AO-EO nonionic surfactants, are likewise particularly preferentially used. Preferably used nonionic surfactants originate from the groups comprising alkoxylated nonionic surfactants, in particular ethoxylated primary alcohols and mixtures of these surfactants with structurally complex surfactants such as polyoxypropylene/polyoxyethylene/polyoxypropylene (PO/EO/PO). Such (PO/EO/PO) nonionic surfactants are furthermore distinguished by good foam control.

The most preferred nonionic surfactants are according to the formula:

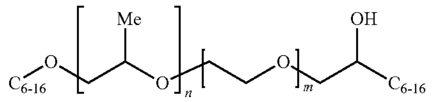

wherein n is from 0 to 5 and m from 10 to 50, more preferably wherein n is from 0 to 3 and m is from 15 to 40, and even more preferably wherein n is 0 and m is from 18 to 25. Surfactants according to this formula were particularly useful in reducing spotting of dishware treated in a machine dish washer. Preferably at least 50 wt. % of the nonionic surfactant comprised by the detergent product of the invention is nonionic surfactant according to this formula. Such nonionic surfactants are commercially available, e.g. under the tradename Dehypon WET (Supplier: BASF) and Genapol EC50 (Supplier Clariant).

The shaped detergent product of the invention preferably comprises from 0.5 to 15 wt. % of nonionic surfactant. The more preferred total amount of nonionic surfactants is from 2.0 to 8 wt. % and even more preferred is an amount of from 2.5 to 5.0 wt. %. The nonionic surfactant used in the detergent product of the invention can be a single nonionic surfactant or a mixture of two or more non-ionic surfactants.

The nonionic surfactant is preferably present in amounts of 25 to 90 wt. % based on the total weight of the surfactant system. Anionic surfactants can be present for example in amounts in the range from 5 to 40 wt. % of the surfactant system.

Anionic Surfactants

Suitable anionic surfactants which may be used are preferably water-soluble alkali metal salts of organic sulphates and sulphonates having alkyl radicals containing from about 8 to about 22 carbon atoms, the term alkyl being used to include the alkyl portion of higher acyl radicals. Examples of suitable synthetic anionic surfactants are sodium and potassium alkyl sulphates, especially those obtained by sulphating higher C8 to C18 alcohols, produced for example from tallow or coconut oil, sodium and potassium alkyl C9 to C20 benzene sulphonates, particularly sodium linear secondary alkyl C10 to C15 benzene sulphonates; and sodium alkyl glyceryl ether sulphates, especially those ethers of the higher alcohols derived from tallow or coconut oil and synthetic alcohols derived from petroleum. The preferred anionic surfactants are sodium C11 to C15 alkyl benzene sulphonates and sodium C12 to C18 alkyl sulphates. Also applicable are surfactants such as those described in EP-A-328 177 (Unilever), which show resistance to salting-out, the alkyl polyglycoside surfactants described in EP-A-070 074, and alkyl monoglycosides.

Bleaching System

It is preferred that the shaped detergent product according to the invention comprises at least 5 wt. %, more preferably at least 8 wt. % and even more preferably at least 10 wt. % of bleaching agent by total weight of the product. The bleaching agent preferably comprises a chlorine-, or bromine-releasing agent or a peroxygen compound. Preferably, the bleaching agent is selected from peroxides (including peroxide salts such as sodium percarbonate), organic peracids, salts of organic peracids and combinations thereof. More preferably, the bleaching agent is a peroxide. Most preferably, the bleaching agent is a percarbonate.

The shaped detergent product of the invention may contain one or more bleach activators such as peroxyacid bleach precursors. Peroxyacid bleach precursors are well known in the art. As non-limiting examples can be named N,N,N',N'-tetraacetyl ethylene diamine (TAED), sodium nonanoyloxybenzene sulphonate (SNOBS), sodium benzoyloxybenzene sulphonate (SBOBS) and the cationic peroxyacid precursor (SPCC) as described in U.S. Pat. No. 4,751,015.

Preferably the shaped detergent product comprises a bleach catalyst. Particularly preferred is a bleach catalyst which is a manganese complex, such as Mn-Me TACN, as described in EP-A-0458397, and/or the sulphonimines of U.S. Pat. Nos. 5,041,232 and 5,047,163. It is advantageous that the bleach catalyst is physically separated in the detergent product from the bleach (to avoid premature bleach activation). Cobalt or iron catalysts can also be used.

Enzymes

The shaped detergent product of the invention further preferably comprises one or more enzymes chosen from proteases, alpha-amylases, cellulases, lipases, peroxidases/oxidases, pectate lyases, and mannanases. Particularly preferred is protease, amylase or a combination thereof. If present the level of each enzyme is from 0.0001 to 1.0 wt. %, more preferably 0.001 to 0.8 wt. %.

Silicates

Silicates are known detergent ingredients, and often included to provide dish wash care benefits, and reduce corrosion of dishware. Particularly preferred silicates are sodium disilicate, sodium metasilicate and crystalline phyllosilicates or mixtures thereof. If present the total amount of silicates preferably is from 1 to 15 wt. %, more preferably from 2 to 10 wt. % and even more preferably from 2.5 to 5.0 wt. % by weight of the shaped detergent product.

Perfume

Preferably the shaped detergent product of the invention comprises one or more colorants, perfumes or a mixture thereof in an amount of from 0.0001 to 8 wt. %, more preferably from 0.001 to 4 wt. % and even more preferably from 0.001 to 1.5 wt. %.

Perfume is preferably present in the range from 0.1 to 1 wt. %. Many suitable examples of perfumes are provided in the CTFA (Cosmetic, Toiletry and Fragrance Association) 1992 International Buyers Guide, published by CFTA Publications and OPD 1993 Chemicals Buyers Directory 80th Annual Edition, published by Schnell Publishing Co. In perfume mixtures preferably 15 to 25 wt. % are top notes. Top notes are defined by Poucher (Journal of the Society of Cosmetic Chemists 6(2):80 [1955]). Preferred top-notes are selected from citrus oils, linalool, linalyl acetate, lavender, dihydromyrcenol, rose oxide and cis-3-hexanol.

Shading Dyes

In particular for laundry detergent products according to the invention, it is preferred that these comprise shading dye. Shading dyes are, for example, added to laundry detergent formulations to enhance the whiteness of fabrics. Shading dyes are preferably blue or violet dyes which are substantive to fabric. A mixture of shading dyes may be used and indeed are preferred for treating mixed fiber textiles. The preferred amount of shading dyes is from 0.00001 to 1.0 wt. %, preferably 0.0001 to 0.1 wt. % and particularly an amount of 0.001 to 0.01 wt. % is preferred. Shading dyes are discussed in WO2005/003274, WO2006/032327, WO2006/032397, WO2006/045275, WO2006/027086, WO02008/017570, WO 2008/141880, WO2009/132870, WO2009/141173, WO 2010/099997, WO 2010/102861, WO2010/148624, WO2008/087497 and WO2011/011799.

Form of the Shaped Detergent Product

Due to the presence of the solid amorphous phase, the shaped detergent product at least contains a solid part. The remainder of the detergent product can also be non-solid, such as in the form of a liquid or a paste, but preferably contains at least one further solid part.

The shaped detergent product is preferably provided as a water-soluble or water-dispersible unit dose. Particularly preferred unit doses are in the form of pouches, which comprise at least one further non-shape stable ingredient, such as a liquid and/or powder; or in the form of tablets. For ease of use, the unit dose is sized and shaped as to fit in the detergent cup of a conventional house-hold machine dish-washer, laundry machine or toilet-rim holder, as is known in the art.

Unit dose pouches preferably have more than one compartment. It is particularly preferred that at least one of such compartments holds a liquid, such as a liquid surfactant, or a powder.

Advantageous unit dose tablets are those which have more than one visually distinct tablet regions. Such regions can be formed by e.g. two distinct (colored) layers or a tablet having a main body and a distinct insert, such as forming a nested-egg. However oriented, one benefit of using multi-compartmental pouches/multi-region tablets is that it can be used to reduce/prevent undesired chemical reactions between two or more ingredients during storage by physical segregation.

Especially in case the detergent product is a machine dish wash detergent product, the more preferred unit dose is a tablet.

Preferably the unit dose detergent product is wrapped to improve hygiene and consumer safety. The wrapper advantageously is based on water-soluble film which preferably a polyvinylalcohol (PVA) based film. Such wrapping prevents direct contact of the detergent product with the skin of the consumer when placing the unit dose in the detergent cup/holder of a e.g. machine dishwasher. A further benefit of course is that the consumer also does not need to remove a water-soluble wrapping before use.

The detergent products according to the invention can be made using known methods and equipment in the field of detergent manufacturing. The detergent product according to the invention can be made by combining the solid amorphous phase of the invention together with the remainder of the detergent ingredients. In view of making tablets, a particularly preferred way of combining is by pressing the solid amorphous phase of the invention onto (or into) the remainder of the tablet ingredients and/or by adding the solid amorphous phase in heated (liquid) form.

Preferred Detergent Product Formulations

A highly preferred general detergent product formulation is as follows:

| Ingredient | Amount (wt. %) |
|---|---|
| Solid amorphous phase according to the invention | 10 to 80 |
| Surfactant | 0.5 to 70 |
| Phosphate | at most 1.0 |
| Preferably perfume and colorants in a combined amount of | 0.0001 to 8.0 |

In case of a machine dish wash detergent product the product is preferably a unit-dose tablet with the following composition:

| Ingredient | Amount (wt. %) |
|---|---|
| Solid amorphous phase according to the invention | 15 to 40 |
| Further builder, preferably alkali carbonate | 5 to 20 |
| Non-ionic surfactant | 0.5 to 15 |
| Enzyme | 0.001 to 0.8 |

-continued

| Ingredient | Amount (wt. %) |
|---|---|
| Silicates | 1 to 10 |
| Bleaching agent + bleach activator + bleach catalyst | 2 to 20 |
| Phosphate | at most 1.0 |
| Preferably perfume and colorants in a combined amount of | 0.001 to 1.5 |

In case of a toilet rim detergent product the product is preferably is a solid block composition, e.g. without comprising liquid parts and/or powder/granular parts and even more preferably having the following composition:

| Ingredient | Amount (wt. %) |
|---|---|
| Solid amorphous phase according to the invention | 40 to 70 |
| Anionic surfactant | 10 to 40 |
| Non-ionic surfactant | 0.5 to 15 |
| Bleaching agent + bleach activator | 2 to 20 |
| Total amount of phosphate | at most 1.0 |
| Preferably perfume and colorants in a combined amount of | 0.001 to 8 |

In case of a laundry detergent product these advantageously have the following composition:

| Ingredient | Amount (wt. %) |
|---|---|
| Solid amorphous phase according to the invention | 5 to 35 |
| Surfactant | 10 to 35 |
| Enzyme | 0.001 to 0.8 |
| Phosphate | at most 1.0 |
| Preferably perfume and colorants in a combined amount of | 0.001 to 4 |

The invention is now illustrated by the following non-limiting examples.

EXAMPLES

Analytical Methods

X-Ray Diffraction (XRD)

XRD was used to detect presence of crystalline material in the solid amorphous phase using to the Wide-Angle X-ray Scattering technique (WAXS). XRD was carried out using a D8 Discover X-Ray Diffractometer from Bruker AXS (activa number: 114175). The XRD measurements was performed using the following settings:

| | 2θ (7-55°) |
|---|---|
| Theta 1 | 7.000 |
| Theta 2 | 10.000/25.000/40.000 |
| X-ray generator (kV/μA) | 50/1000 |
| Time (sec) | 300 |
| Collimator (mm) | 1 |
| Detector distance (cm) | 32.5 |
| Tube Anode | Cu |

Differential Scanning Calorimetry

Differential Scanning calorimetry (DSC) was used to measure the glass transition temperature (Tg) of the solid amorphous phase. The equipment used of the DSC analysis was a Perkin Elmer power compensated DSC8000 equipped with an Intracooler Ill as cooling means. The stainless-steel sample pan was used which is provided with the equipment by the Supplier and filled according to Supplier instructions with material to be analyzed. The amount of material added to the sample pan (sample weight) was from 10 to 40 mg. The following settings were used in running the measurement:

| | |
|---|---|
| DSC temperature regime | Hold for 1.0 min at 20.00° C.;<br>Cool from 20.00° C. to −20.00° C. at 10.00° C./min;<br>Hold for 2.0 min at −20.00° C.;<br>Heat from −20.00° C. to 90.00° C. at 5.00° C./min;<br>Hold for 2.0 min at 90.00° C.;<br>Cool from 90.00° C. to −20.00° C. at 10.00° C./min;<br>Hold for 2.0 min at −20.00° C.;<br>Heat from −20.00° C. to 90.00° C. at 5.00° C./min; |
| Atmosphere | Nitrogen 20 ml/min |

The Tg of the samples was measured with the second heating (i.e. the last heating step in the DSC temperature regime).

Examples 1-8

Solid amorphous phases according to the invention were made starting from an aqueous solution having a composition as set out in the following Table A.

TABLE A

Composition of aqueous solutions, amounts are given in parts by weight.

| | Ex 1 | Ex 2 | Ex 3 | Ex 4 | Ex 5 | Ex 6 | Ex 7 | Ex 8 |
|---|---|---|---|---|---|---|---|---|
| [1]GLDA | — | — | — | — | — | 68 | 46 | 50 |
| [2]MGDA | 50 | 60 | 70 | — | 60 | — | — | — |
| [3]EDDS | — | — | — | 50 | — | — | — | — |
| [4]Citric acid | 50 | 40 | 30 | 50 | — | 28 | 46 | 50 |
| [5]Acetic acid | — | — | — | — | 40 | | — | — |
| [6]Polyacrylate | — | — | — | — | — | 4 | 8 | — |
| [7]Other | 6 | 7 | 9 | — | 7 | 4 | 3 | 3 |
| Water | 119 | 123 | 126 | 143 | 123 | 113 | 128 | 103 |

[1]GLDA: Dissolvine GL-47-S (Supplier: Akzo Nobel) is a 47% solution of GLDA containing 50% water. The amount given in Table A is the amount of GLDA.
[2]MGDA: Trilon (M): (Supplier: BASF) is a 40% solution of MGDA containing 55% water. The amount given in Table A is the amount of MGDA.
[3]EDDS: (analytical grade, Supplier: Sigma Aldrich) is a 35% solution of the trinatrium salt of EDDS containing about 65% water. The amount given in Table A is the amount of EDDS.
[4]Citric Acid: used as a 50% solution. The amount given in Table A is the amount citric acid.
[5]Acetic Acid: used as a 50% solution. The amount given in Table A is the amount of acetic acid.
[6]Polyacrylate: Sokalan PA 25 CL (Supplier BASF), supplied as granules comprising 80% polyacrylate. Average molar mass Mw is 4000. The amount in Table A is the amount of polyacrylate.
[7]Contained in aminopolycarboxylate.

The aqueous solutions were heated to boiling in a frying pan. Next, boiling was continued to allow evaporation of water. The liquid was poured into a fully transparent petri dish and passively allowed to cool to room temperature at which a solid was formed.

The final water levels and the water activity ($A_w$) of the resulting solid compositions are given in the following table (Table B):

TABLE B

| | Water content (wt. %) | Water activity ($A_w$) |
|---|---|---|
| Example 1 | 16.5 | 0.44 |
| Example 2 | 12.8 | 0.45 |
| Example 3 | 13.6 | 0.40 |
| Example 4 | 13.5 | 0.50 |
| Example 5 | 13.5 | 0.26 |
| Example 6 | 8.7 | 0.32 |
| Example 7 | 20.8 | n.d. |
| Example 8 | 14.2 | n.d. |

Figure 2:
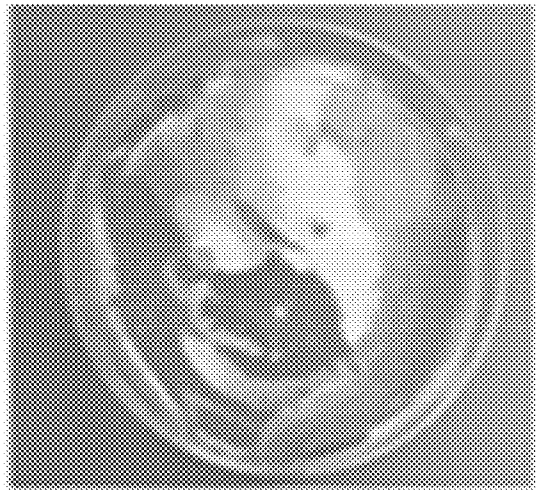
FIG. 2: photograph of the solid amorphous phase of Example 2.
Figure 1:
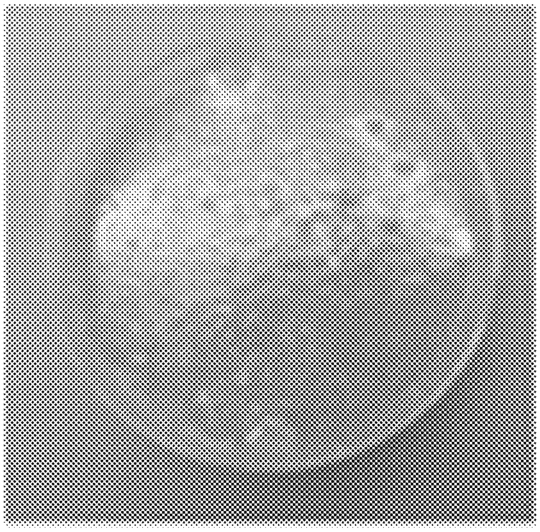
FIG. 1: photograph of the solid amorphous phase of Example 1.

The solid compositions according to Examples 1 to 8 were subsequently analyzed. First, the translucency was evaluated by eye. All solid amorphous phases according to the Examples were translucent (even transparent) and were glossy. FIGS. 1 to 3 are photographs taken from the solid amorphous phase of Example 1, 4 and 5 respectively.

Figure 4:
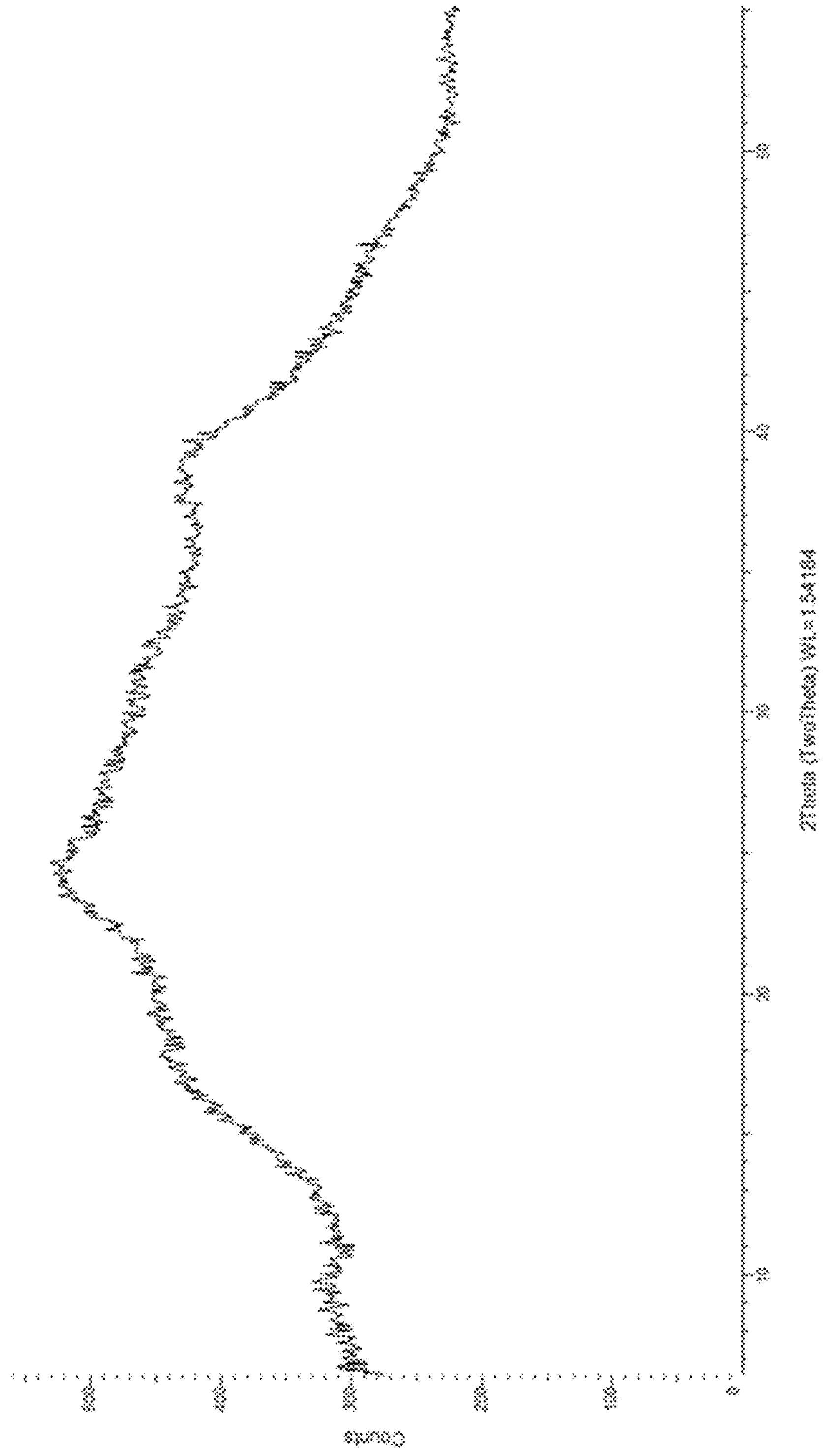
FIG. 4: a WAXS graph of Example 1 (according to the invention): the presence of crystals is not detected.

X-Ray Diffraction was used to assess the presence of crystals in the solid amorphous phase. None of the solids of the Examples showed detectable crystalline structures and were hence fully amorphous compositions. FIG. 4 is a WAXS graph of Example 1 (according to the invention) showing no detectable presence of crystals.

The solids of Example 6 and 7 showed substantially improved plasticity when compared to the solid of Example 8

The glass transition temperature ($T_g$) of the solid amorphous phases was also analyzed. A relatively high $T_g$ and given in the following table (Table C):

TABLE C

Glass transition temperature of the solid amorphous phases. Numbers for each solid composition represent the averages of two independent measurements.

| | $T_g$ (° C.) |
|---|---|
| Example 1 | 17 |
| Example 2 | 23.5 |
| Example 3 | 33 |
| Example 4 | 2.5 |
| Example 5 | 18 |

Examples 9 and 10

Solid amorphous phases according to the invention were made starting from an aqueous solution having a formulation as set out in the following Table D.

TABLE D

| | Ex 9 | Ex 10 |
|---|---|---|
| [1]GLDA | 80 | 90 |
| [2]Citric acid | 20 | 10 |
| Water | 110 | 111 |

[1]GLDA: Dissolvine GL-47-S (Supplier: Akzo Nobel) is a 47% solution of GLDA. The amount given in Table A is the amount of GLDA.
[2]Citric Acid: used as a 50% solution. The amount given in Table A is the amount citric acid.

The solid phases were prepared in the same was as described in Examples 1-8. Both solid phases were found to be amorphous and translucent.

A 10 wt. % aqueous solution of the solid amorphous phases was prepared and the pH of these solutions was determined at 25 degrees Celsius. The results are shown in Table E.

TABLE E

| | Ex 9 | Ex 10 |
|---|---|---|
| pH (10%) | 6.1 | 9.0 |

The invention claimed is:

1. A shaped detergent product comprising 10-100 wt. % of a solid amorphous phase and 0-90 wt. % of one or more other solid phases, said solid amorphous phase comprising:

25-88 wt. % free acid equivalent of aminopolycarboxylate;

10-60 wt. % free acid equivalent of an acid, said acid not being an aminopolycarboxylate;

6-30 wt. % water;

wherein the shaped detergent product contains at least 0.5 wt. % surfactant;

wherein the solid amorphous phase has a continuous volume of between 0.1 and 20 $cm^3$; and wherein the solid amorphous phase is prepared from an aqueous solution containing the aminopolycarboxylate, the acid, and at least 35 wt. % water by reducing the water content of the solution between 12 and 30 wt. % by boiling to produce a liquid desiccated mixture whilst keeping the liquid mixture at a temperature of at least 50 degrees Celsius, followed by cooling of the desiccated mixture to a temperature of less than 25 degrees Celsius to obtain the solid amorphous phase.

2. The shaped detergent product according to claim 1, wherein the product contains 10-90 wt. % of the solid amorphous phase and 10-90 wt. % of one or more other solid phases.

3. The shaped detergent product according to claim 1, wherein the solid amorphous phase contains aminopolycarboxylate and the acid in a weight ratio of aminopolycarboxylate to acid of 1:2 to 1:0.15, based on the weight of the free acid equivalents.

4. The shaped detergent product according to claim 1, wherein the free acid equivalent of an acid, said acid not being an aminopolycarboxylate is selected from acetic acid, citric acid, aspartic acid, lactic acid, adipic acid, succinic acid, glutaric acid, malic acid, tartaric acid, maleic acid, fumaric acid, saccharic acids, sulfuric acid, hydrochloric acid and combinations thereof.

5. The shaped detergent product according to claim 4, wherein the free acid equivalent of an acid, said acid not being an aminopolycarboxylate is a di- and/or tri-carboxylic acid having a molecular weight, in fully protonated form, of not more than 300 Dalton.

6. The shaped detergent product according to claim 5, wherein the free acid equivalent of an acid, said acid not being an aminopolycarboxylate is citric acid.

7. The shaped detergent product according to claim 1, wherein the amorphous phase contains 25-88 wt. % free acid equivalent of aminopolycarboxylate selected from glutamic acid N,N-diacetic acid (GLDA), methylglycinediacetic acid (MGDA), ethylenediaminedisuccinic acid (EDDS), iminodisuccinic acid (IDS), iminodimalic acid (IDM) and combinations thereof.

8. The shaped detergent product according to claim 7, wherein the amorphous phase contains 25-88 wt. % of aminopolycarboxylate selected from GLDA, MGDA, EDDS and combinations thereof.

9. The shaped detergent product according to claim 1, wherein the amorphous phase contains 6-25 wt. % water.

10. The shaped detergent product according to claim 1, wherein the amorphous phase contains not more than 30 wt. % of ingredients other than aminopolycarboxylate, acid and water.

11. The shaped detergent product according to claim 1, wherein the solid amorphous phase is translucent or transparent.

12. The shaped detergent product according to claim 1, wherein the product comprises 10-90 wt. % of the amorphous phase and 10-90 wt. % of a second solid phase that is opaque.

13. The shaped detergent product according to claim 12, wherein the second phase contains at least 1 wt. % surfactant.

14. The shaped detergent product according to claim 1, wherein the shaped detergent product has a unit weight of 5 to 50 grams.

15. The shaped detergent product according to claim 1, wherein at least 10% of the surface area of the shaped detergent product consists of the amorphous solid phase.

* * * * *